US010123401B2

(12) United States Patent
Lin et al.

(10) Patent No.: US 10,123,401 B2
(45) Date of Patent: Nov. 6, 2018

(54) METHOD AND INDICATING SYSTEM FOR A VEHICLE

(71) Applicant: KWANG YANG MOTOR CO., LTD., Kaohsiung (TW)

(72) Inventors: Chen-Sheng Lin, Kaohsiung (TW); Yi-Yang Tsai, Kaohsiung (TW); John C. Wang, Taipei (TW); Ming-San Huang, Taipei (TW); Li-Hui Chen, Taipei (TW); Chi-Hui Hsu, Taipei (TW); Nai-Kun Yeh, Taipei (TW); Chih-Feng Hsu, Taipei (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 15/726,949

(22) Filed: Oct. 6, 2017

(65) Prior Publication Data

US 2018/0110113 A1 Apr. 19, 2018

(30) Foreign Application Priority Data

Oct. 14, 2016 (TW) .............................. 105133152 A

(51) Int. Cl.
H05B 37/02 (2006.01)
B60Q 1/48 (2006.01)
B60R 25/24 (2013.01)
G08G 1/005 (2006.01)
G08G 1/00 (2006.01)
H04W 4/80 (2018.01)

(52) U.S. Cl.
CPC ......... *H05B 37/0272* (2013.01); *B60Q 1/482* (2013.01); *B60R 25/24* (2013.01); *G08G 1/005* (2013.01); *G08G 1/205* (2013.01); *H04W 4/80* (2018.02)

(58) Field of Classification Search
CPC ........................... B60Q 1/482; H05B 37/0272
See application file for complete search history.

(56) References Cited

U.S. PATENT DOCUMENTS

| 8,326,136 | B1* | 12/2012 | Clark | G03B 15/02 396/164 |
| 2006/0143645 | A1* | 6/2006 | Vock | A43B 3/00 725/9 |
| 2009/0256483 | A1* | 10/2009 | Gehman | H05B 37/0272 315/129 |
| 2011/0082599 | A1* | 4/2011 | Shinde | H02J 13/0003 700/295 |
| 2011/0093123 | A1* | 4/2011 | Alexanian | A01G 25/16 700/284 |

* cited by examiner

*Primary Examiner* — Douglas W Owens
*Assistant Examiner* — Syed M Kaiser
(74) *Attorney, Agent, or Firm* — Brinks Gilson & Lione

(57) ABSTRACT

A method to be implemented by a vehicle capable of communication with a portable electronic device is shown. The vehicle includes an electrical system including a power switch, and an indicating system including a processor, a wireless transmission module and an indicating unit. The method includes: controlling the electrical system to temporarily provide electric power to the indicating system when the power switch is switched from a conductive state to a non-conductive state; determining whether a wireless connection is established between the portable electronic device and the wireless transmission module. When it is determined that the wireless connection is established, activating the indicating unit to output an indication signal.

18 Claims, 8 Drawing Sheets

METHOD AND INDICATING SYSTEM FOR A VEHICLE

CROSS-REFERENCE TO RELATED APPLICATION

This application claims priority to Taiwanese Patent Application No. 105133152 filed on Oct. 14, 2016.

FIELD

The disclosure relates to a method and an indicating system for a vehicle.

BACKGROUND

A user of a vehicle usually parks the vehicle in a parking lot of a shopping mall or a wholesale store when going shopping. However, it is troublesome for the user to locate the parked vehicle when the parking lot is relatively large. Further, the user may even forget where the vehicle is parked.

SUMMARY

Therefore, an object of the present disclosure is to provide a method and an indicating system for a vehicle.

According to one aspect of the present disclosure, a method is to be implemented by a vehicle capable of communicating with a portable electronic device. The vehicle includes an electrical system that includes a power switch, and an indicating system that includes a processor, a wireless transmission module and an indicating unit.

The method includes steps of: controlling, by the processor, the electrical system to temporarily provide electric power to the indicating system after the power switch is switched from a conductive state to a non-conductive state; determining, by the processor, whether a wireless connection is established between the portable electronic device and the wireless transmission module; and when it is determined by the processor that the wireless connection is established, activating, by the processor, the indicating unit to output an indication signal.

According to another aspect of the present disclosure, a method for a vehicle capable of communicating with a portable electronic device is provided. The vehicle includes an electrical system that includes a power switch, and an indicating system that includes a processor, a wireless transmission module and an indicating unit.

The method includes steps of: controlling, by the processor, the electrical system to temporarily provide electric power to the indicating system after the power switch is switched from a conductive state to a non-conductive state; determining, by the processor, whether a wireless signal from the portable electronic device is received through the wireless transmission module; and when it is determined by the processor that the wireless signal is received, activating, by the processor, the indicating unit to output an indication signal.

According to still another aspect of the present disclosure, a method for a vehicle capable of communicating with a portable electronic device is provided. The vehicle includes an electrical system that includes a power switch, and an indicating system that includes a processor, a wireless transmission module and an indicating unit.

The method includes steps of: controlling, by the processor, the electrical system to provide electric power to the indicating system when the power switch is in a conductive state; determining, by the processor, whether one of a first condition that a wireless connection is established between the portable electronic device and the wireless transmission module and a second condition that a wireless signal from the portable electronic device is received through the wireless transmission module is satisfied; and when it is determined by the processor that one of the first and second conditions is satisfied, activating, by the processor, the indicating unit to output an indication signal.

According to yet another aspect of the present disclosure, an indicating system to be installed on a vehicle is provided. The vehicle includes an electrical system that includes a power switch. The indicating system includes a host computer and an indicating unit. The host computer includes a processor, and a wireless transmission module electrically connected to the processor and operable to establish a wireless connection with a portable electronic device and to receive a wireless signal from the portable electronic device. The indicating unit is electrically connected to the host computer. When the processor controls the electrical system to provide electric power to the indicating system, the processor activates the indicating unit to output an indication signal when the processor determines that one of a first condition that a wireless connection is established between the portable electronic device and the wireless transmission module and a second condition that a wireless signal from the portable electronic device is received through the wireless transmission module is satisfied.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
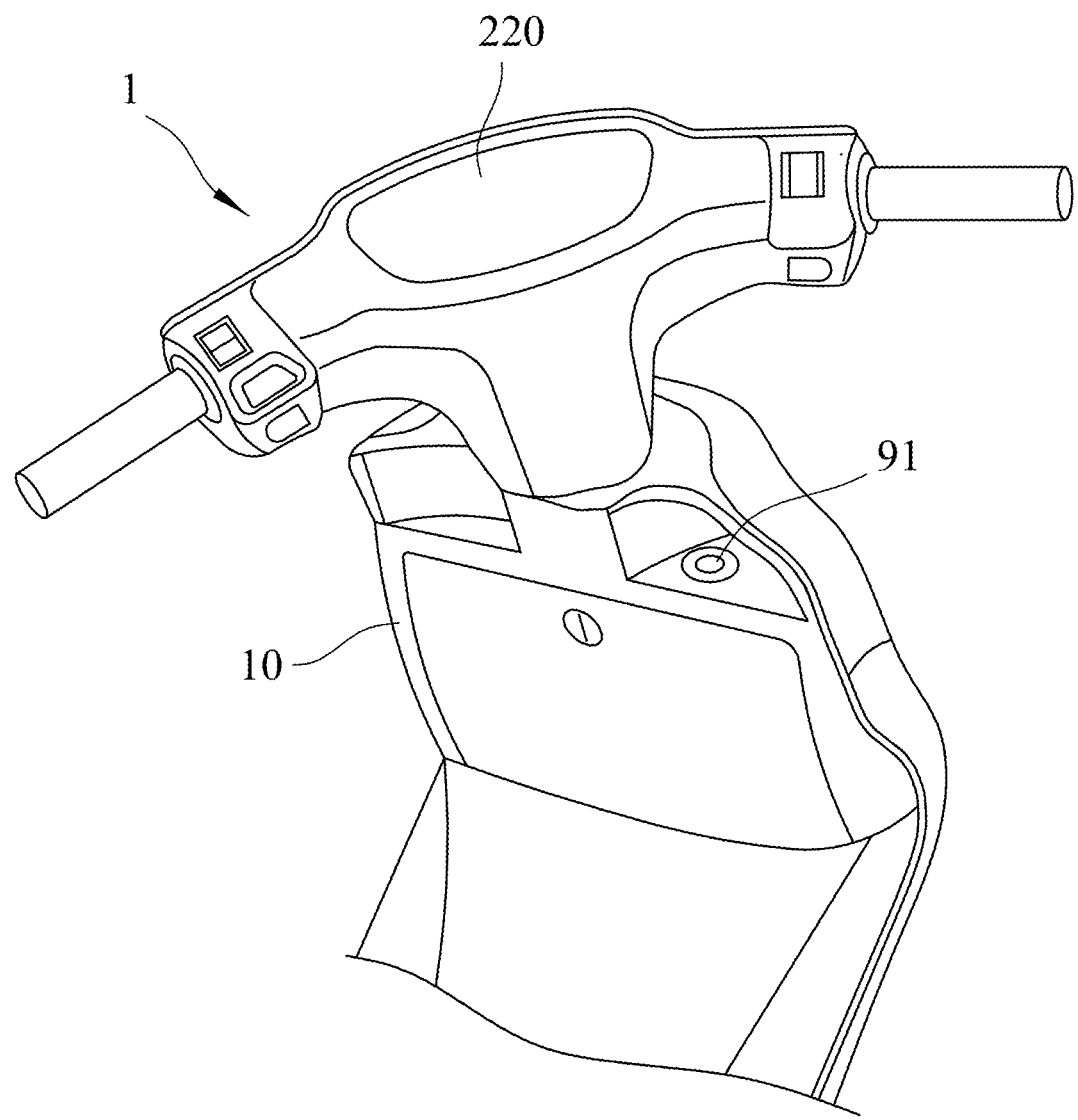
FIG. 1 is a fragmentary schematic perspective view of a vehicle provided with an indicating system for the vehicle according to an embodiment of the present disclosure.
Figure 2:
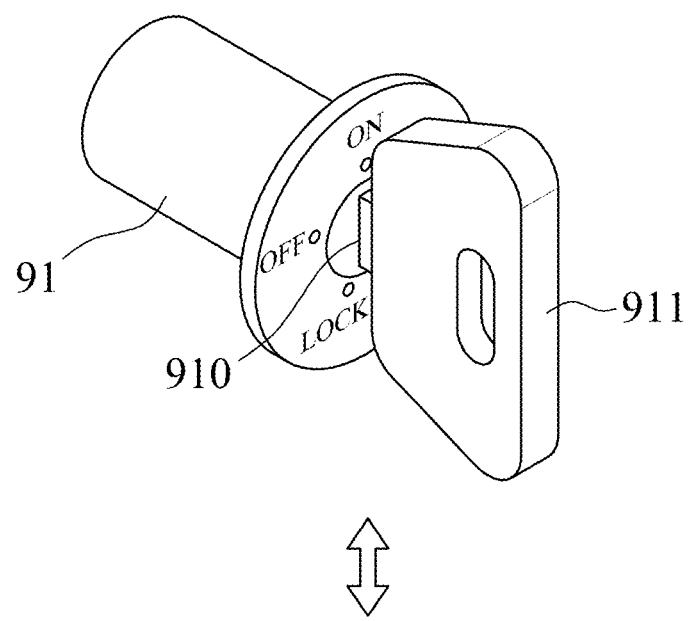
FIG. 2 is a schematic perspective view illustrating a power switch of the vehicle being operated between a conductive state and a non-conductive state.
Figure 2:
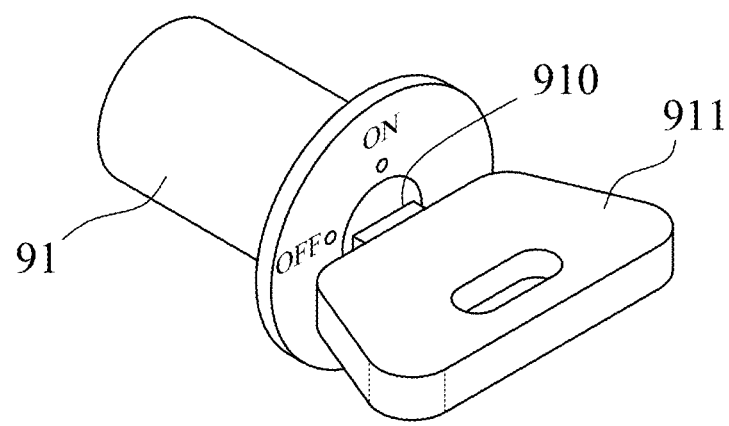
Figure 3:
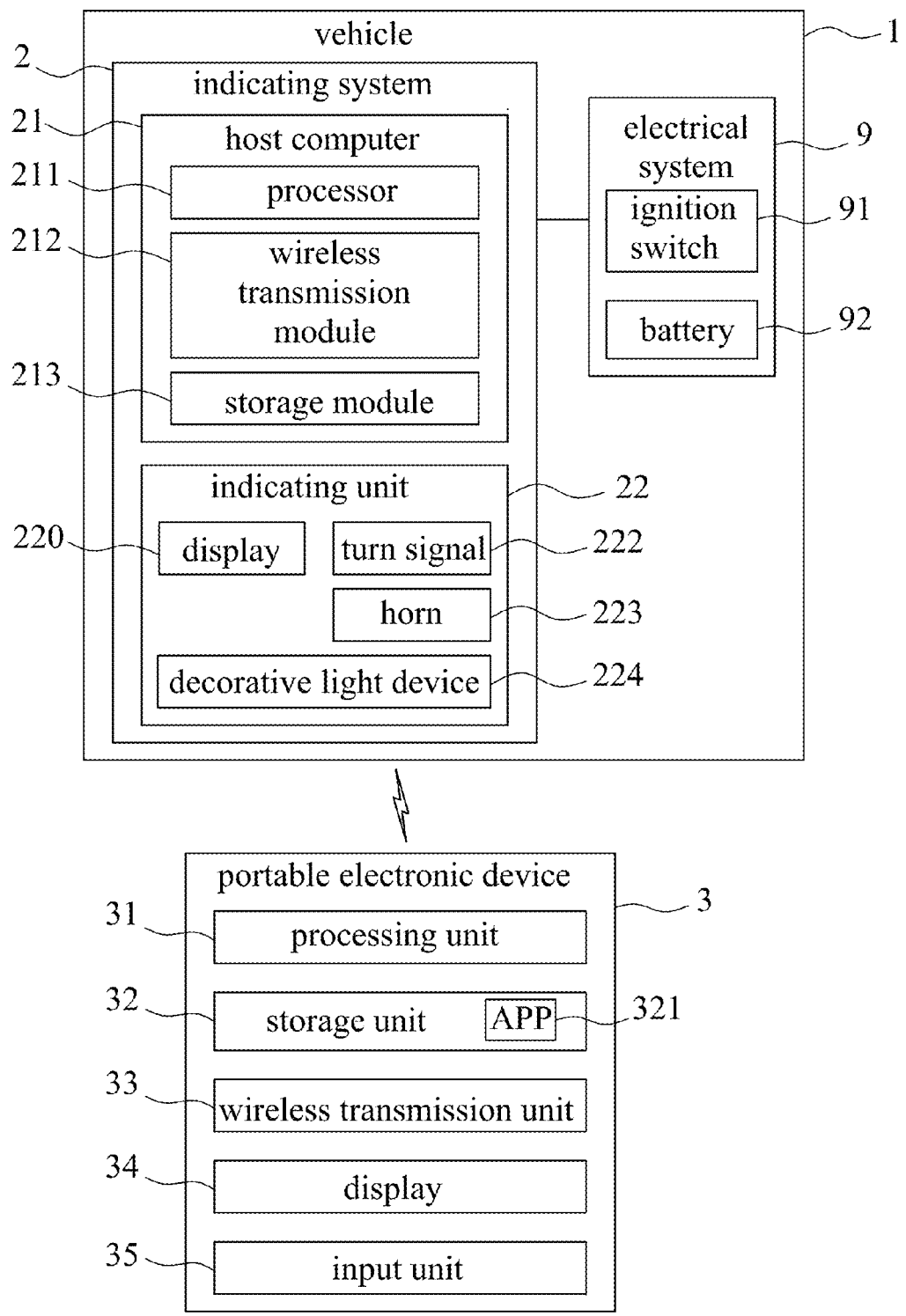
FIG. 3 is a block diagram of the vehicle and a block diagram of a portable electronic device communicating with the vehicle.

Referring to FIGS. 1 to 3, a vehicle 1 is installed with an indicating system 2 for the vehicle 1 according to an embodiment of this disclosure, and is capable of communicating with a portable electronic device 3. The vehicle 1 can be an automobile, a scooter, an all terrain vehicle (ATV), a utility vehicle (UV), an electric vehicle, or any transportation carrier. In this embodiment, the vehicle 1 is a scooter but the disclosure is not limited in this aspect. The vehicle 1 includes a main body 10, and an electrical system 9 electrically connected to the indicating system 2. The electrical system 9 includes a power switch 91 having a key hole 910 that is paired with a key 911, and a battery 92. As shown in FIG. 2, the power switch 91 can be switched between a conductive state (ON) and a non-conductive state (OFF) by inserting the key 911 into the key hole 910 and rotating the key 911 in a clockwise direction to an "ON" position (see the upper part of FIG. 2) and in a counter-clockwise direction to an "OFF" position (see the lower part of FIG. 2), respectively. In this embodiment, the power switch 91 is a main switch of the vehicle 1.

Generally, the battery 92 provides electric power to the vehicle 1 when the power switch 91 is switched to the conductive state, and stops providing electric power to most components of the vehicle 1 when the power switch 91 is switched to the non-conductive state (will be explained later). Note that, in other embodiments, the combination of the key 911 and the power switch 91 may be implemented by a smart key and a keyless switch, and the present disclosure is not limited in this respect.

The indicating system 2 is mounted to the main body 10, and includes a host computer 21 and an indicating unit 22. The host computer 21 includes a processor 211, a wireless transmission module 212 electrically connected to the processor 211, and a storage module 213 electrically connected to the processor 211. The wireless transmission module 212 is implemented by a Bluetooth transmission module in this embodiment. In other embodiments, the wireless transmission module 212 may be implemented as a Wi-Fi module, a near field communication module, etc. The indicating unit 22 is electrically connected to the processor 211 of the host computer 21, and is activated by the processor 211 to output an indication signal so as to indicate a position of the vehicle 1 to a user of the portable electronic device 3.

The indicating unit 22 includes a display 220 to be dimmed and brightened at a cycle simulating a breathing rhythm, which is referred to as generating breathing light hereinafter, a turn signal 222 to generate flashing light, a horn 223 to output sound, and a decorative light device 224 to emit decorative light. The display 220, the turn signal 222, the speaker 223 and the decorative light device 224 may individually or cooperatively indicate the position of the vehicle 1. In other words, one or more of the breathing light generated by the display 220, the flashing light generated by the turn signal 22, the sound outputted by the horn 223 and the decorative light generated by the decorative light device 224 may serve as the indicating signal. In some embodiments, the indicating unit 22 may include one or more of the display 220, the turn signal 222, the horn 223 and the decorative light 224.

The portable electronic device 3 includes a processing unit 31, a storage unit 32, a wireless transmission unit 33, a display 34 and an input unit 35. The storage unit 32 stores an application program (APP) 321 therein, and is implemented by a hard disk in this embodiment. The wireless transmission unit 33 is configured to wirelessly communicate with the wireless transmission module 212 of the host computer 21 of the indicating system 2, and thus has to use the same communication protocol as the wireless transmission module 212. That is to say, the wireless transmission unit 33 of the portable electronic device 3 is also implemented by a Bluetooth transmission module in this embodiment, and can be implemented by any transmission module using any other wireless transmission technology as long as the same communication protocol is used by the wireless transmission unit 33 and the wireless transmission module 212. In this embodiment, the display 34 and the input unit 35 of the portable electronic device 3 are integrated as a touch screen, but the disclosure is not limited in this respect.

Figure 4:
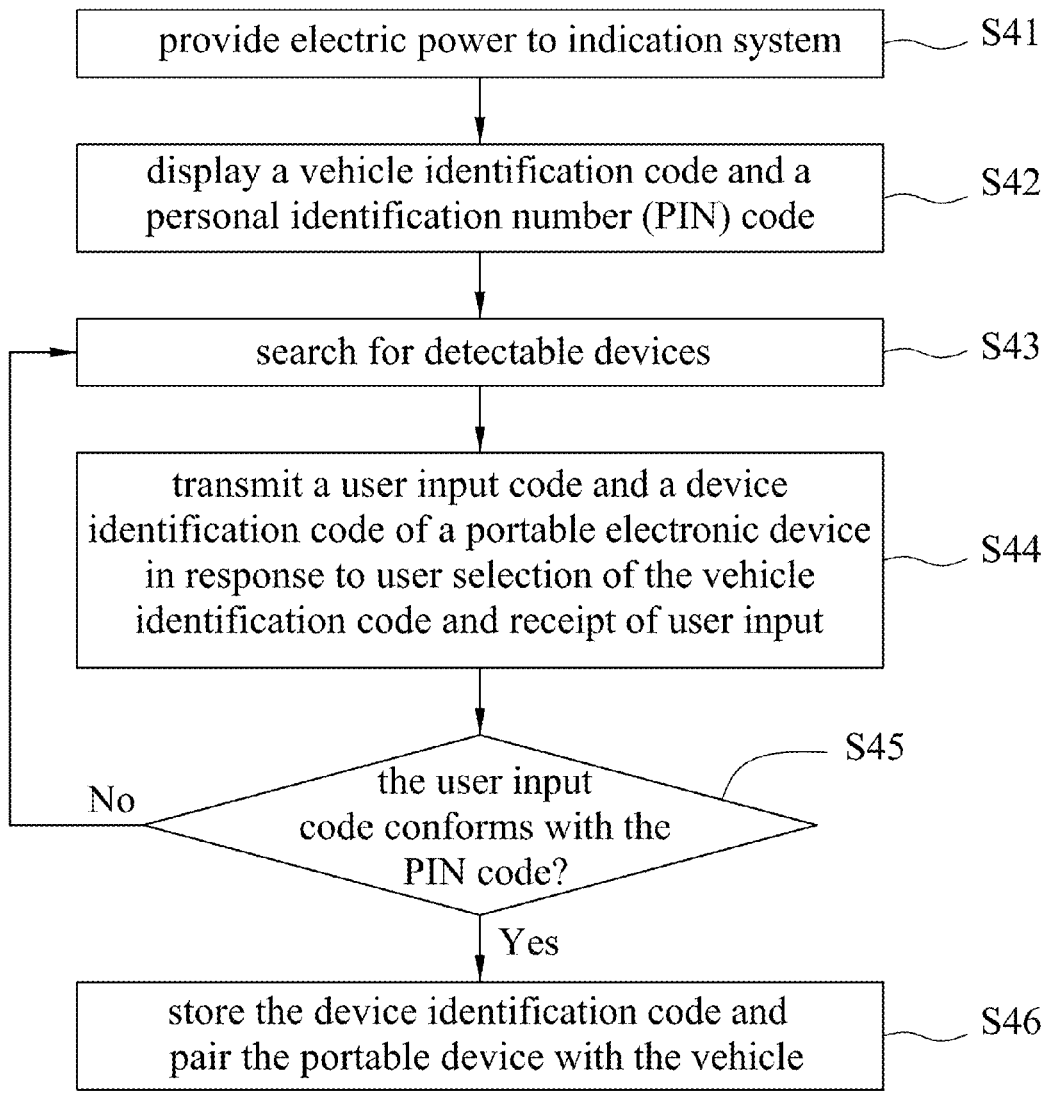
FIG. 4 is a flow chart illustrating a pairing procedure of a method for the vehicle according to an embodiment of the present disclosure.
Figure 5A:
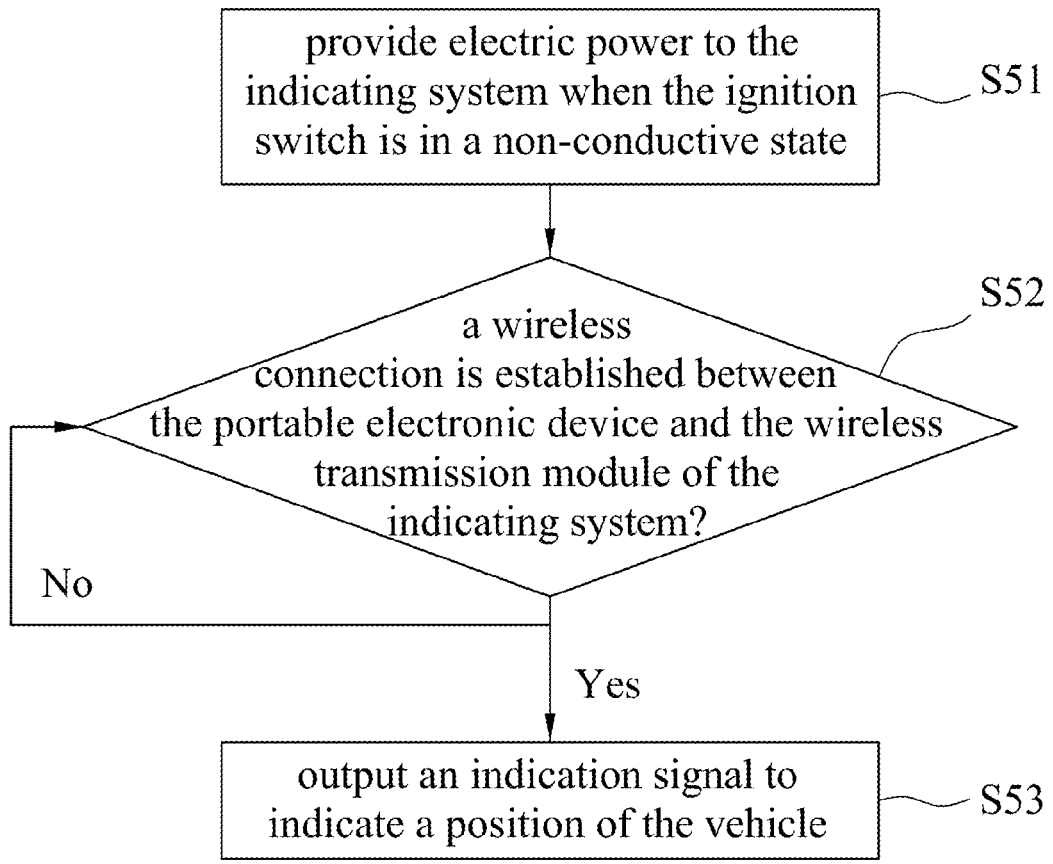
FIG. 5A is a flow chart illustrating one example of an indicating procedure of the method for the vehicle.
Figure 5B:
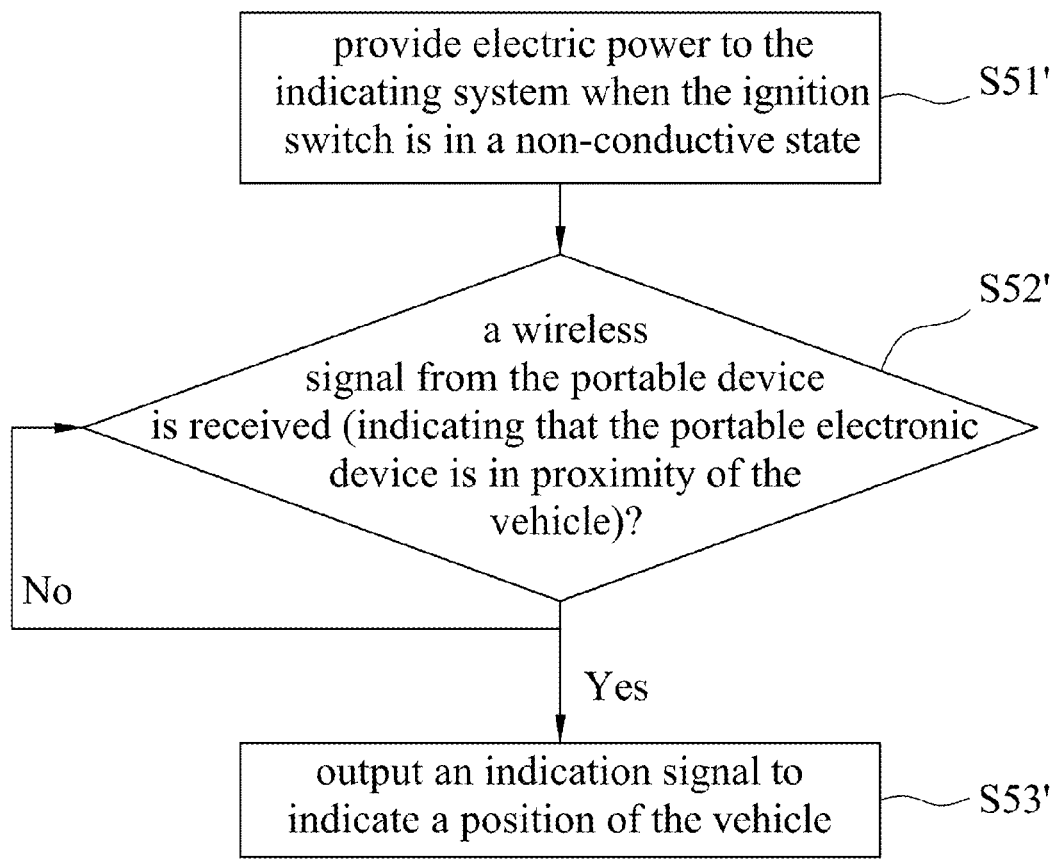
FIG. 5B is a flow chart illustrating another example of the indicating procedure of the method for the vehicle.

Referring to FIGS. 4, 5A and 5B, a method for indicating a position of the vehicle 1 according to some embodiments of this disclosure is shown to include a pairing procedure (FIG. 4) and an indicating procedure (FIGS. 5A and 5B). The pairing procedure is implemented for pairing the portable electronic device 3 and the vehicle 1 before a wireless connection therebetween is established. Referring to FIG. 4, the pairing procedure for pairing the portable electronic device 3 and the vehicle 1 is described first.

In step S41, the processor 21 controls the electrical system 9 to provide electric power from the battery 92 to the indicating system 2 when the power switch 91 is in the conductive state.

In step S42, the display 220 of the indicating unit 22 of the indicating system 2 is activated by the user, e.g., pressing a button (not shown) on the vehicle 1, to display a vehicle identification code of the vehicle 1 and a personal identification number (PIN) code, and the wireless transmission module 212 sends out the vehicle identification code. In this embodiment, the wireless transmission module 212 and the wireless transmission unit 33 are both Bluetooth transmission modules, and the vehicle identification code is a media access control (MAC) address of the vehicle 1. Note that in other embodiments where the wireless transmission module 212 and the wireless transmission unit 33 are implemented using other wireless transmission technologies, the vehicle identification code of the vehicle 1 may be international mobile equipment identity (IMEI), and the present disclosure is not limited in this respect. In some embodiments, the vehicle identification code is randomly generated. In some embodiments, the display 220 of the indicating unit 22 only displays the vehicle identification code in this step.

In step S43, the APP 321 stored in the storage unit 32 is activated by the user to search for detectable devices including the vehicle 1, which is to be paired therewith, and then the display 34 of the portable electronic device 3 displays the vehicle identification code of the vehicle 1 when the vehicle identification code is searched out. Then, the portable electronic device 3 allows the user to input a user input code and to select the vehicle identification code. The user is expected to look at the display 220 which has the PIN code displayed thereon, and enter the corresponding digits as the user input code for authentication purpose. For example, the processing unit 31 executes the APP 321 to make the display 34 display an interface allowing the user to input the user input code and to select the vehicle identification code via the input unit 35. In some embodiments, the display 34 of the portable electronic device 3 displays a vehicle model of the vehicle 1, rather than the vehicle identification code, for the user selection.

In step S44, in response to the user selection of the vehicle identification code and the user input of the user input code, the portable electronic device 3 transmits the user input code and a device identification code of the portable electronic device 3 to the wireless transmission module 212 of the indicating unit 21.

In step S45, the processor 211 determines whether the user input code received from the portable electronic device 3 through the wireless transmission module 212 conforms with the PIN code. When the determination made in step S45 is affirmative, the flow goes to step S46; otherwise, the flow goes back to step S43.

In step S46, the processor 211 stores the device identification code of the portable electronic device 3 in the storage module 213 and pairs the portable electronic device 3 with the vehicle 1.

Note that in some embodiments of this disclosure, the display 220 of the indicating system 2 may display only the vehicle identification code of the vehicle 1 in step S42. In this case, the display 34 only displays the vehicle identification code and the portable electronic device 3 allows the user to select the vehicle identification code displayed on the display 34 in step S43. Then, the portable electronic device 3 only transmits the device identification code of the portable electronic device 3 to the wireless transmission module 212 of the indicating unit 21 in step S44, and thus, the processor 211 directly stores the device identification code in the storage module 213 and pairs the portable electronic device 3 with the vehicle 1 without implementing step S45.

Now turning to FIG. 5A, one example of the indicating procedure of the method for indicating a position of the vehicle 1 is illustrated. In step S51, the processor 211 controls the electrical system 9 to temporarily provide electric power from the battery 92 to the indicating system 2 after the power switch 91 is switched from the conductive state to the non-conductive state, such that the indicating system 2 operates in a standby state. In the standby state, the wireless transmission module 212 is powered up by the electric power provided by the battery 92 to detect a radio signal in compliance with the transmission protocol used by the wireless transmission module 212, i.e., Bluetooth in this embodiment. In this embodiment, the processor 211 controls the battery 92 to provide electric power to the indicating system 2 for a predetermined duration (e.g., 48 hours) after the power switch 91 is switched from the conductive state to the non-conductive state. When the predetermined duration has elapsed, the electrical system 9 stops outputting electric power to the indicating system 2 and the method is terminated.

In step S52, the processor 211 determines whether a wireless connection is established between the wireless transmission unit 33 of the portable electronic device 3 and the wireless transmission module 212 of the indicating system 21. When it is determined by the processor 211 that a wireless connection is established, the flow goes to step S53; otherwise, step S52 is repeated. Generally, since the portable electronic device 3 has been paired with the vehicle 1 in advance (after completion of the pairing procedure), the wireless connection between the wireless transmission unit 33 of the portable electronic device 3 and the wireless transmission module 212 of the indicating system 21 should be automatically established once a radio signal transmitted by the wireless transmission unit 33 of the portable electronic device 3 is detected by the wireless transmission module 212 of the indicating system 21. In this case, "pairing a device with another device" means that the two devices are bonded and the next time the two devices come into vicinity of each other, an automatic wireless connection will be established without requiring further user operation.

In step S53, the processor 211 activates the indicating unit 22 to output the indication signal so as to indicate a position of the vehicle 1 to the user of the portable electronic device 3. In some embodiments, the processor 211 controls the indicating unit 22 to repeatedly output the indication signal at a frequency that is directly proportional to a strength of the wireless connection (i.e., a strength of a wireless signal received from the portable electronic device 3 through the wireless transmission module 212).

Further referring to FIG. 5B, another example of the indicating procedure of the method is illustrated. In this example, steps S51' and S53' are identical to steps S51 and S53 of FIG. 5A, and descriptions thereof are thus omitted for the sake of brevity. The difference between the foregoing example illustrated in FIG. 5A and this example resides in the following. In step S52', the wireless transmission module 212 is powered up to detect whether the portable electronic device 3 is in proximity of the vehicle 1 by determining whether a wireless signal from the wireless transmission unit 33 of the portable electronic device 3 is received. When the determination made above is affirmative, a flow goes to step S53'; otherwise, step S52' is repeated. In this embodiment, the processor 211 activates the indicating unit 22 to output the indication signal once the wireless signal from the wireless transmission unit 33 of the portable electronic device 3 is received by the wireless transmission unit 212 without establishing a wireless connection between the wireless transmission unit 33 and the wireless transmission module 212. In this case, "pairing a device with another device" means that the next time the two devices come into vicinity of each other, one device can identify the other device without requiring further user operation.

Figure 6:
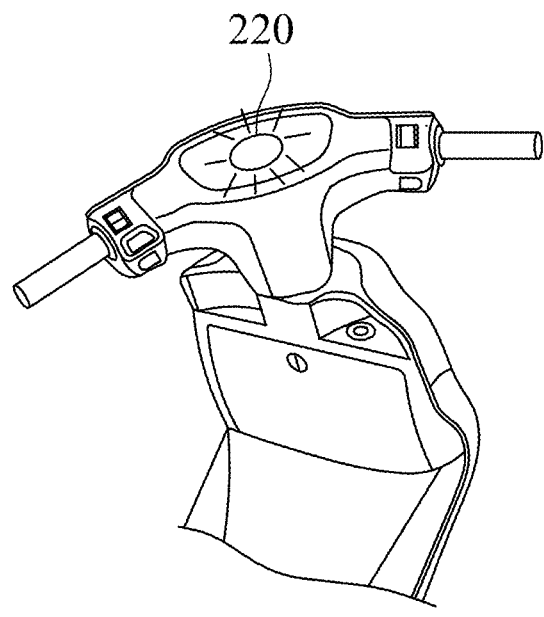
FIG. 6 is a schematic view illustrating a display of the vehicle generating breathing light.
Figure 6:
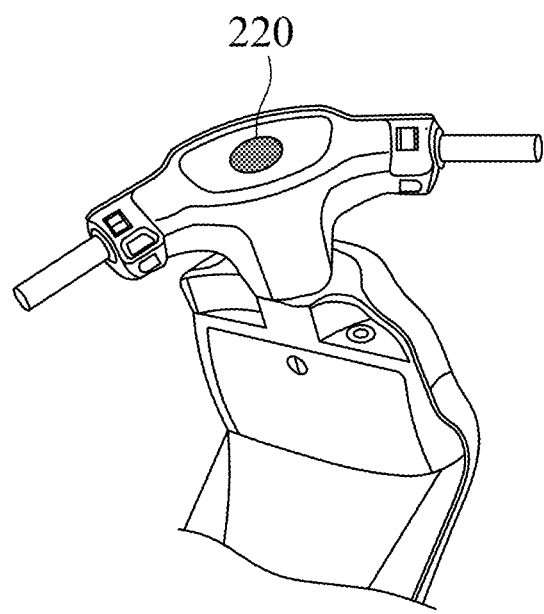

An example of using the embodiments of the present disclosure will be described in the following. When a user of the vehicle 1, which is parked in a wholesale parking lot, finishes shopping and returns to the wholesale parking lot with the portable electronic device 3, which is paired with the vehicle 1 in advance, the indicating unit 22 will be activated by the processor 211 when a strength of a wireless signal received from the portable electronic device 3 through the wireless transmission module 212 is larger than a predetermined received signal strength (RSS) value (e.g., −80 dB). As a result of the activation, the indicating unit 22 outputs an indication signal such as sound and/or light to indicate the position of the vehicle 1 to the user. As shown in FIG. 6, the display 220 of the indicating unit 22 (see FIG. 2) generates the breathing light as the indication signal when the wireless signal from the portable electronic device 3 is received and the strength thereof is larger than the predetermined RSS value. Specifically, in this example, the display 220 of the indicating unit 22 is controlled to repeatedly generate the breathing light with a predetermined luminance and color, e.g., red, at a breathing frequency (i.e., the frequency of the light being cyclically dimmed and brightened) what is directly proportional to the strength of the received wireless signal. That is to say, as the user approaches the vehicle 1, the breathing frequency of the breathing light generated by the display 220 increases.

In other examples, the color of the light generated by the display 220 of the indicating unit 22 may vary according to the strength of the wireless signal. For example, the display 220 generates red light as the indication signal when the strength of the wireless signal is relatively weak as the user is relatively far away from the vehicle 1, and generates green light as the indication signal when the strength of the wireless signal is relatively strong as the user is relatively close to the vehicle 1. In yet another example, the turn signal 222, the horn 223 and the decorative light device 224 of the indicating unit 22 may be successively turned on to generate the flashing light, to output the sound and to emit the decorative light as the user approaches the vehicle 1. Additionally, the sound and/or light generated by the indicating unit 22 can be customized by using the APP 321 as required. By this way, the indicating unit 22 provides a splendid visual aesthetic effect to the vehicle 1.

Figure 7:
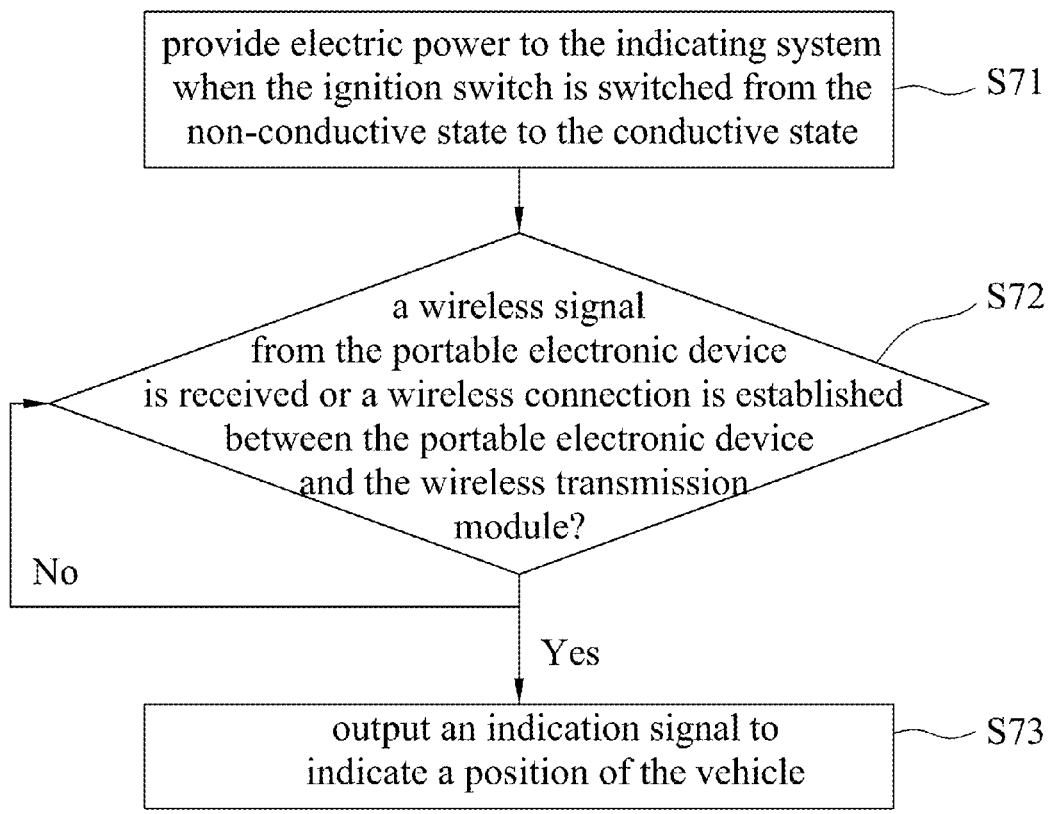
FIG. 7 is a flow chart illustrating yet another example of the indicating procedure of the method for the vehicle.

Referring to FIG. 7, yet another example of the indicating procedure of the method for indicating the position of the vehicle 1 is illustrated. In step S71, the processor 211 controls the electrical system 9 to provide electric power from the battery 92 to the indicating system 2 after the power switch 91 is switched from the non-conductive state to the conductive state. In step S72, the processor 211 determines whether a wireless signal from the portable electronic device 3 is received or whether a wireless connection is established between the wireless transmission unit 33 and the wireless transmission module 212. When either one of the determinations made above is affirmative, the flow of the method goes to step S73; otherwise, step S72 is repeated. In step S73, the processor 211 activates the indicating unit 22 to output an indication signal to indicate a position of the vehicle 1 to the user of the portable electronic device 3.

In a scenario that the vehicle 1 has been stolen, once the user/owner of the vehicle 1 carrying the portable electronic device 3 approaches the vehicle 1 to the extent that a strength of the wireless signal received by the wireless transmission unit 33 is larger than the predetermined RSS value or the wireless connection is established between the wireless transmission unit 33 and the wireless transmission module 212, the indicating unit 22 is activated to output the indication signal to thereby notify the user of a position of the vehicle 1.

To sum up, in the present disclosure, by virtue of the wireless transmission module 212 that is temporarily provided with electric power as controlled by the processor 211, the indicating unit 22 is activated to output an indication signal when either a wireless signal from the portable electronic device 3 is received or a wireless connection is established between the portable electronic device 3 and the vehicle 1, such that the indicating unit 22 can provide the splendid visual aesthetic effect to the vehicle 1 when the user approaches the vehicle 1. In addition, the user of the vehicle 1 can be notified of a position of the vehicle 1 by the indicating signal regardless of whether the power switch 91 of the vehicle 1 is in the conductive state or in the non-conductive state (within the predetermined duration).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for a vehicle, the method to be implemented by a vehicle capable of communication with a portable electronic device, the vehicle including an electrical system that includes a power switch, and an indication system that includes a processor, a wireless transmission module and an indicating unit, the method comprising steps of:
    controlling, by the processor, the electrical system to temporarily provide electric power to the indicating system after the power switch is switched from a conductive state to a non-conductive state;
    determining, by the processor, whether a wireless connection is established between the portable electronic device and the wireless transmission module;
    when it is determined by the processor that the wireless connection is established, activating, by the processor, the indicating unit to output an indication signal.

2. The method as claimed in claim 1, wherein the step of activating the indicating unit to output an indication signal includes controlling the indicating unit to repeatedly output the indication signal at a frequency that is directly proportional to a strength of the wireless connection.

3. The method as claimed in claim 1, the indicating unit including a display, the indicating system further including a storage module, the method further comprising a pairing procedure including steps of:
    displaying, by the display, a vehicle identification code of the vehicle when the power switch is in a conductive state;
    sending out, by the wireless transmission module, the vehicle identification code to be searched by the portable electronic device and displayed thereon, after which the portable electronic device allows a user to select the vehicle identification code, and transmits a device identification code of the portable electronic device to the wireless transmission module in response to user selection of the vehicle identification code;
    receiving, by the wireless transmission module, the device identification code from the portable electronic device; and
    storing, by the processor, the device identification code of the portable electronic device in the storage module and pairing the portable electronic device with the vehicle to allow the wireless connection to be established therebetween.

4. The method as claimed in claim 1, wherein the indicating unit includes one of a display to generate breathing light as the indication signal, a turn signal to generate flashing light as the indication signal, a horn to output sound as the indication signal, and a decorative light device to emit decorative light as the indication signal.

5. A method for a vehicle, the method to be implemented by a vehicle capable of communication with a portable electronic device, the vehicle including an electrical system that includes a power switch, and an indication system that includes a processor, a wireless transmission module, and an indicating unit, the method comprising steps of:
    controlling, by the processor, the electrical system to temporarily provide electric power to the indicating system after the power switch is switched from a conductive state to a non-conductive state;
    determining, by the processor, whether a wireless signal from the portable electronic device is received through the wireless transmission module;
    when it is determined by the processor that the wireless signal is received, activating, by the processor, the indicating unit to output an indication signal.

6. The method as claimed in claim 5, wherein the step of activating the indicating unit to output an indication signal includes controlling the indicating unit to repeatedly output the indication signal at a frequency that is directly proportional to a strength of the wireless signal received from the portable electronic device.

7. The method as claimed in claim 5, the indicating unit including a display, the indicating system further including a storage module, the method further comprising a pairing procedure including steps of:
displaying, by the display, a vehicle identification code of the vehicle when the power switch is in a conductive state;
sending out, by the wireless transmission module, the vehicle identification code, the portable electronic device allowing a user select the vehicle identification code after searching out and displaying the vehicle identification code, the portable electronic device transmitting a device identification code of the portable electronic device to the wireless transmission module in response to user selection of the vehicle identification code;
receiving, by the wireless transmission module, the device identification code from the portable electronic device; and
storing, by the processor, the device identification code of the portable electronic device in the storage module and pairing the portable electronic device with the vehicle to allow transmission of the wireless signal.

8. The method as claimed in claim 5, wherein the indicating unit includes one of a display to generate breathing light as the indication signal, a turn signal to generate flashing light as the indication signal, a horn to output sound as the indication signal, and a decorative light device to emit decorative light as the indication signal.

9. A method for a vehicle, the method to be implemented by a vehicle capable of communication with a portable electronic device, the vehicle including an electrical system that includes a power switch, and an indicating system that includes a processor, a wireless transmission module and an indicating unit, the method comprising steps of:
controlling, by the processor, the electrical system to provide electric power to the indicating system when the power switch is in a conductive state;
determining, by the processor, whether one of a first condition that a wireless connection is established between the portable electronic device and the wireless transmission module and a second condition that a wireless signal from the portable electronic device is received through the wireless transmission module is satisfied;
when it is determined by the processor that one of the first and second conditions is satisfied, activating, by the processor, the indicating unit to output an indication signal.

10. The method as claimed in claim 9, wherein the step of activating the indicating unit to output an indication signal includes controlling the indicating unit to repeatedly output the indication signal at a frequency that is directly proportional to a strength of the wireless connection in the first condition or a strength of the wireless signal received from the portable electronic device in the second condition.

11. The method as claimed in claim 9, the indicating unit including a display, the indicating system further including a storage module, the method further comprising a pairing procedure including steps of:
displaying, by the display, a vehicle identification code of the vehicle when the power switch is in a conductive state;
sending out, by the wireless transmission module, the vehicle identification code, the portable electronic device allowing a user to select the vehicle identification code after searching out and displaying the vehicle identification code, the portable electronic device transmitting a device identification code of the portable electronic device to the wireless transmission module in response to user selection of the vehicle identification code;
receiving, by the wireless transmission module, the device identification code from the portable electronic device; and
storing, by the processor, the device identification code of the portable electronic device in the storage module and pairing the portable electronic device with the vehicle.

12. The method as claimed in claim 9, wherein the indicating unit includes one of a display to generate breathing light as the indication signal, a turn signal to generate flashing light as the indication signal, a horn to output sound as the indication signal, and a decorative light device to emit decorative light as the indication signal.

13. An indicating system to be installed on a vehicle, the vehicle including an electrical system that includes a power switch, said indicating system comprising:
a host computer that includes a processor, and a wireless transmission module electrically connected to said processor and being operable to establish a wireless connection with a portable electronic device and to receive a wireless signal from the portable electronic device; and
an indicating unit electrically connected to said host computer,
wherein, when said processor controls the electrical system to temporarily provide electric power to said indicating system after the power switch is switched from a conductive state to a non-conductive state, said processor activates said indicating unit to output an indication signal when said processor determines that one of a first condition that a wireless connection is established between the portable electronic device and said wireless transmission module and a second condition that a wireless signal from the portable electronic device is received through said wireless transmission module is satisfied; and
wherein, when said processor controls the electrical system to provide electric power to said indicating system after the power switch is switched from the non-conductive state to the conductive state, said processor activates said indicating unit to output the indication signal when said processor determines that one of the first condition and the second condition is satisfied.

14. indicating system as claimed in claim 13, wherein said indicating unit is activated by said processor to repeatedly output the indication signal at a frequency that is directly proportional to a strength of the wireless connection in the first condition or a strength of the wireless signal received from the portable electronic device in the second condition.

15. The indicating system as claimed in claim 13, wherein said host computer further includes a storage module electrically connected to said processor, and said indicating unit includes a display,
wherein, when said indicating system implements in a pairing procedure,
said display displays a vehicle identification code of the vehicle while the power switch is in a conductive state, said wireless transmission module sends out the vehicle identification code, the portable electronic device allowing a user to select the vehicle identification code after searching out and displaying the vehicle identification code, the portable electronic device transmitting a device identification code of the portable electronic device to said wireless transmission module in response to user selection of the vehicle identification code, and said processor stores the device identification code of the portable electronic device in said storage module and pairs the portable electronic device with the vehicle to allow the wireless connection to be established or the wireless signal to be received.

16. The indicating system as claimed in claim 13, wherein said wireless transmission module is a Bluetooth transmission module.

17. The indicating system as claimed in claim 13, wherein said indicating unit includes at least one of a display to generate breathing light as the indication signal, a turn signal to generate flashing light as the indication signal, a horn to output sound as the indication signal, and a decorative light device to emit decorative light as the indication signal.

18. The indicating system as claimed in claim 13, wherein said power switch is a main switch of the vehicle.

* * * * *